(12) United States Patent
Tagawa et al.

(10) Patent No.: US 9,180,375 B2
(45) Date of Patent: Nov. 10, 2015

(54) SERVER DEVICE AND NON-TRANSITORY COMPUTER-READABLE RECORD MEDIUM

(71) Applicant: DeNA Co., Ltd., Tokyo (JP)

(72) Inventors: Keisuke Tagawa, Tokyo (JP); Junji Okayama, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 246 days.

(21) Appl. No.: 13/870,648

(22) Filed: Apr. 25, 2013

(65) Prior Publication Data

US 2014/0004920 A1 Jan. 2, 2014

(30) Foreign Application Priority Data

Jun. 28, 2012 (JP) ................................ 2012-145578

(51) Int. Cl.
| | | |
|---|---|---|
| *A63F 9/24* | (2006.01) | |
| *A63F 13/00* | (2014.01) | |
| *A63F 13/30* | (2014.01) | |
| *A63F 13/533* | (2014.01) | |
| *A63F 13/822* | (2014.01) | |
| *A63F 13/335* | (2014.01) | |

(52) U.S. Cl.
CPC ............... *A63F 13/12* (2013.01); *A63F 13/335* (2014.09); *A63F 13/533* (2014.09); *A63F 13/822* (2014.09)

(58) Field of Classification Search
CPC ......... A63F 13/45; A63F 13/47; A63F 13/60; A63F 13/69; A63F 2300/308; A63F 2300/60; A63F 2300/609; A63F 2300/63; A63F 2300/632; A63F 13/12; A63F 13/335; A63F 13/40; A63F 13/48; A63F 13/49; A63F 13/50; A63F 13/52; A63F 13/53; A63F 13/533; A63F 13/67; A63F 13/822; A63F 2300/30; A63F 2300/303
USPC .......................................... 463/30–32, 40–43
See application file for complete search history.

(56) References Cited

U.S. PATENT DOCUMENTS

| | | | | |
|---|---|---|---|---|
| 2002/0160835 A1* | 10/2002 | Fujioka et al. | ................... | 463/31 |
| 2007/0066380 A1* | 3/2007 | Miura | .............................. | 463/16 |
| 2008/0227543 A1* | 9/2008 | Kawase et al. | ................... | 463/31 |
| 2012/0115581 A1* | 5/2012 | Englman et al. | ................. | 463/25 |
| 2013/0288757 A1* | 10/2013 | Guthridge et al. | ................. | 463/2 |

FOREIGN PATENT DOCUMENTS

JP           2012-024248           2/2012

OTHER PUBLICATIONS

Notification of Reason for Refusal, in corresponding Japenese Application No. 2012-145578, dated Dec. 4, 2012, 5 pages.
"It is not too late Special number featuring Royale Ninja Royale" Takashi Ikegaya and other 10 members, App Fan Korean whirlwind January special number, Cosmic Publication Corporation, Jan. 1, 2012, 9 pages.

* cited by examiner

*Primary Examiner* — Milap Shah
(74) *Attorney, Agent, or Firm* — Rothwell, Figg, Ernst & Manbeck, P.C.

(57) ABSTRACT

An object of the present invention is to raise a player's interest in an operation of a mission screen in a social game. A server device configured to be connected over a network to a user terminal, the server device configured to control a game that progresses as a player accomplishes given missions, the server device includes: a screen data generation unit configured to generate data of a mission screen in response to a request from the user terminal operated by the player, the mission screen having displayed thereon a plurality of mission progress buttons for causing the missions to progress; and a response process unit configured to perform a process of causing a predetermined event to occur in response to an input from the player through any of the plurality of mission progress buttons.

4 Claims, 8 Drawing Sheets

SERVER DEVICE AND NON-TRANSITORY COMPUTER-READABLE RECORD MEDIUM

CROSS-REFERENCE TO RELATED APPLICATION

The present application claims priority upon Japanese Patent Application No. 2012-145578 filed Jun. 28, 2012 which is herein incorporated by reference.

BACKGROUND

1. Technical Field

The present invention relates to a server device and a non-transitory computer-readable record medium.

2. Related Art

A social game is known that progresses as a player accomplishes missions (which are referred to differently depending on games, such as quests and searches).

In a common social game, a mission screen is displayed on a user terminal operated by the player, and a progress button for the mission to progress is displayed on the mission screen. Then, the player presses the progress button, thereby the mission progresses.

However, the operation directly performed by the player when causing the mission to progress is only pressing the single progress button displayed on the screen. Thus, the game operation becomes monotonous, resulting in difficulty in raising the player's interest in the operation of the mission screen.

SUMMARY

The present invention has been conceived in view of the above issue, and an object thereof is to raise the player's interest in the operation of the mission screen in the social game.

An aspect of the present invention to solve the above and other problems is a server device configured to be connected over a network to a user terminal, the server device configured to control a game that progresses as a player accomplishes given missions, the server device including:
 a screen data generation unit configured to generate data of a mission screen in response to a request from the user terminal operated by the player, the mission screen having a plurality of mission progress buttons displayed thereon, the mission progress buttons used for causing the missions to progress; and
 a response process unit configured to perform a process of causing a predetermined event to occur in response to an input from the player through any of the plurality of mission progress buttons.

Other features of the present invention will become apparent from the description in the detailed description of the present invention and the attached drawings.

DETAILED DESCRIPTION OF THE INVENTION

Figure 1:
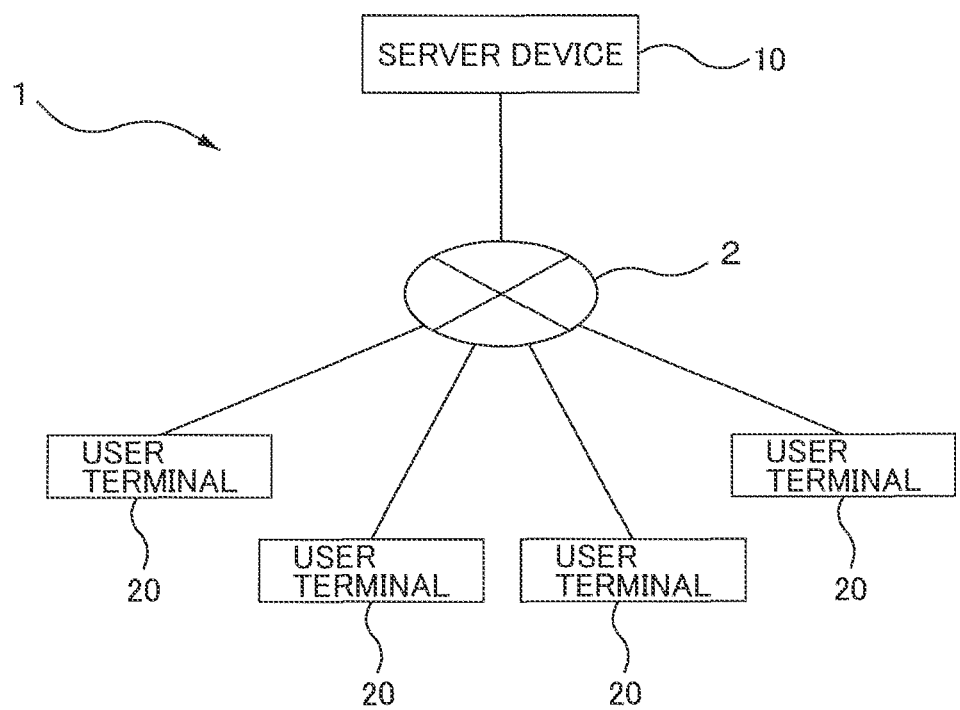
FIG. 1 is a diagram illustrating an example of an overall configuration of a game system 1 according to the present embodiment.

From the description in the detailed description of the invention and the accompanied drawings, at least the following matters will be apparent.

From the present specification and the accompanied drawings, at least the following matters will be apparent.

A server device is configured to be connected over a network to a user terminal and control a game that progresses as a player accomplishes given missions, and the server device includes:
 a screen data generation unit configured to generate data of a mission screen in response to a request from the user terminal operated by the player, the mission screen having a plurality of mission progress buttons displayed thereon, the mission progress buttons used for causing the missions to progress; and
 a response process unit configured to perform a process of causing the predetermined event to occur in response to an input from the player through any of the plurality of mission progress buttons;

With such a server device, the player can choose the button to be pressed by himself/herself in the operation of the mission screen in a social game, thereby being able to further raise the interest of the player.

The server device may further include: a random selection unit configured to randomly select the event that will occur during the mission in a repetitive manner, until parameters assigned to the player change and satisfy the predetermined condition; and a number determination unit for buttons configured to determine the number of the mission progress buttons to be displayed on the mission screen, according to the number of the events randomly selected.

With such a server device, the player is allowed to choose his/her favorite button among a plurality of mission progress buttons displayed on the mission screen, thereby being able to cause the player to feel like as if the predetermined event will occur in response to the player's own choice. Thus, the player's interest in the operation of the mission screen can be raised.

Further, in such a server device, the random selection unit may end random selection when the specific event has been selected by random selection, and the number determination unit for buttons may determine the number of the mission progress buttons to be displayed on the mission screen, according to the number of the events randomly selected before the specific event has been selected by random selection.

With such a server device, the number of mission progress buttons to be displayed is determined in accordance with occurrence of the specific event, such as a battle, thereby being able to cause the player to expect occurrence of the specific event. Thus, the player's interest can be raised.

Further, in such a server device, the screen data generation unit may generate data of the mission screen having the mission progress buttons displayed thereon with the number thereof decreased in response to each input from the player through the mission progress button.

With such a server device, it is possible to cause the player himself/herself to expect a certain event will occur when all the mission progress buttons displayed on the mission screen have been pressed. Thereby, the player's interest can be raised.

Further, a game program for causing an information processing device to execute a game that progresses as a player accomplishes given missions, will be apparent, the game program instructing the information processing device to perform the following processes: a process to generate data of a mission screen in response to a request from a user terminal operated by the player, the mission screen having a plurality of mission progress buttons displayed thereon, the mission progress buttons used for causing the mission to progress; and a process to cause the predetermined event to occur in response to an input from the player through any of a plurality of mission progress buttons.

EMBODIMENT

Configuration of Game System

FIG. 1 is a diagram illustrating an example of an overall configuration of a game system 1 according to the present embodiment.

The game system 1 is a system configured to provide various types of services related to a game (social game) to a user (hereinafter, also referred to as "player") over a network 2. The game system 1 includes a plurality of user terminals 20 and a server device 10 each connected to the network 2 to be capable of communicating with each other.

The user can play a game transmitted over the network 2 by accessing the game system 1 from a user terminal 20. Further, the user can communicate with a plurality of users by accessing the game system 1.

Server Device 10

The server device 10 is an information processing device used by a person such as a system administrator when managing and controlling the game service.

Figure 2:
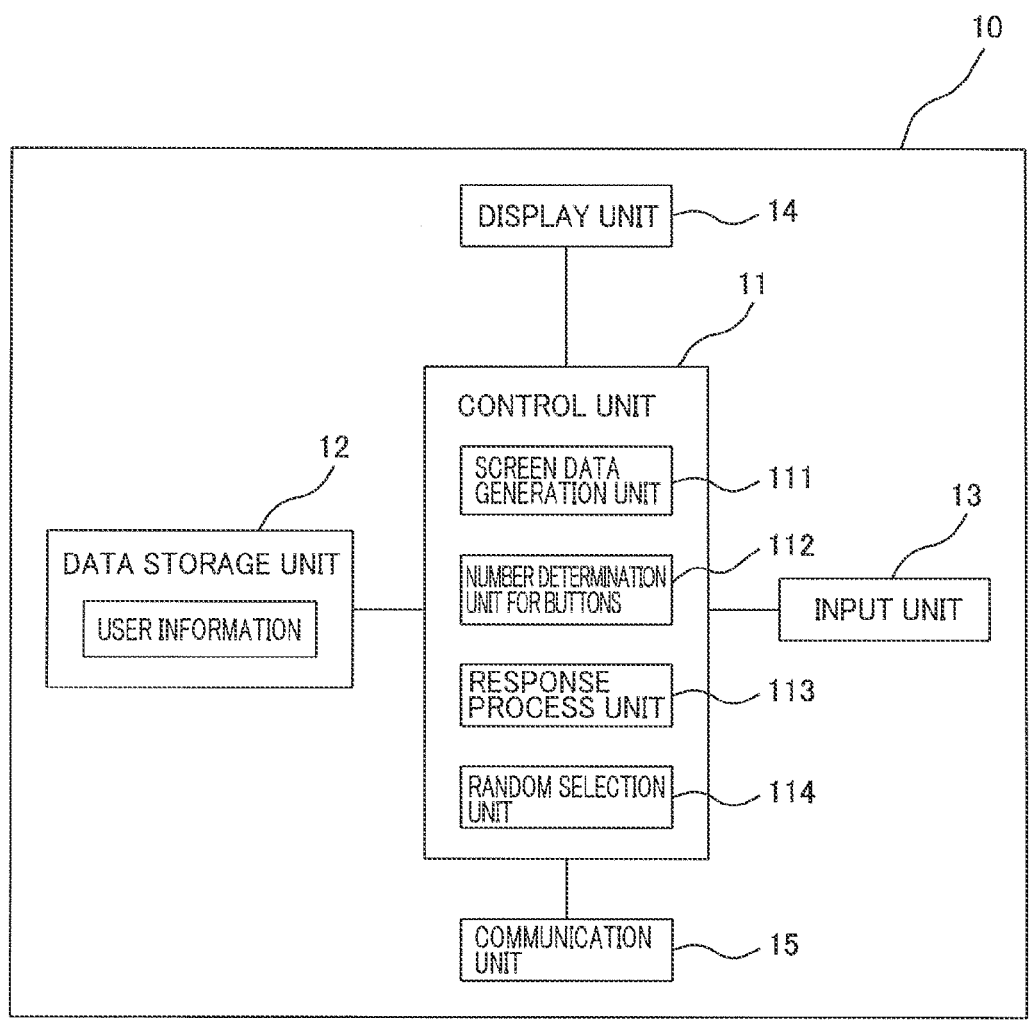
FIG. 2 is a block diagram illustrating a functional configuration of a server device 10 according to the present embodiment.

FIG. 2 is a block diagram illustrating a functional configuration of the server device 10. The server device 10 according to the present embodiment includes: a control unit 11, a data storage unit 12, an input unit 13, a display unit 14, and a communication unit 15.

The control unit 11 is a unit that transfers data among the units, and controls the entire server device 10. The control unit 11 includes a screen data generation unit 111, a number determination unit 112 for buttons, a response process unit 113, and a random selection unit 114. The specific operations of the units will be described later.

The data storage unit 12 stores user information (e.g., user IDs, parameters set for each player in playing the game, etc.) which is information related to the players of the game.

The input unit 13 is a unit with which a person such as a system administrator inputs various types of data and setting related to the game (setting of an event which will be described later, or the like), and is realized, for example, by a keyboard, a mouse, and the like.

The display unit 14 is a unit that displays an operating screen for the system administrator according to commands from the control unit 11, and is realized, for example, by a liquid crystal display (LCD) and the like.

The communication unit 15 is a unit that performs communication with the user terminals 20, and has a function as a reception unit for receiving signals and various types of data transmitted from the user terminals 20, and a function as a transmission unit for transmitting signals and various types of data to the user terminals 20 in response to commands from the control unit 11. The communication unit 15 is realized, for example, an NIC (Network Interface Card) and the like.

User Terminal 20

The user terminal 20 is an information processing terminal operated by the user when playing a game. The user terminal 20 may be, for example, a mobile phone terminal, a smartphone, a personal computer, a game machine, and the like; and transmit/receive information to/from the server device 10 that is accessible over the network 2.

Figure 3:
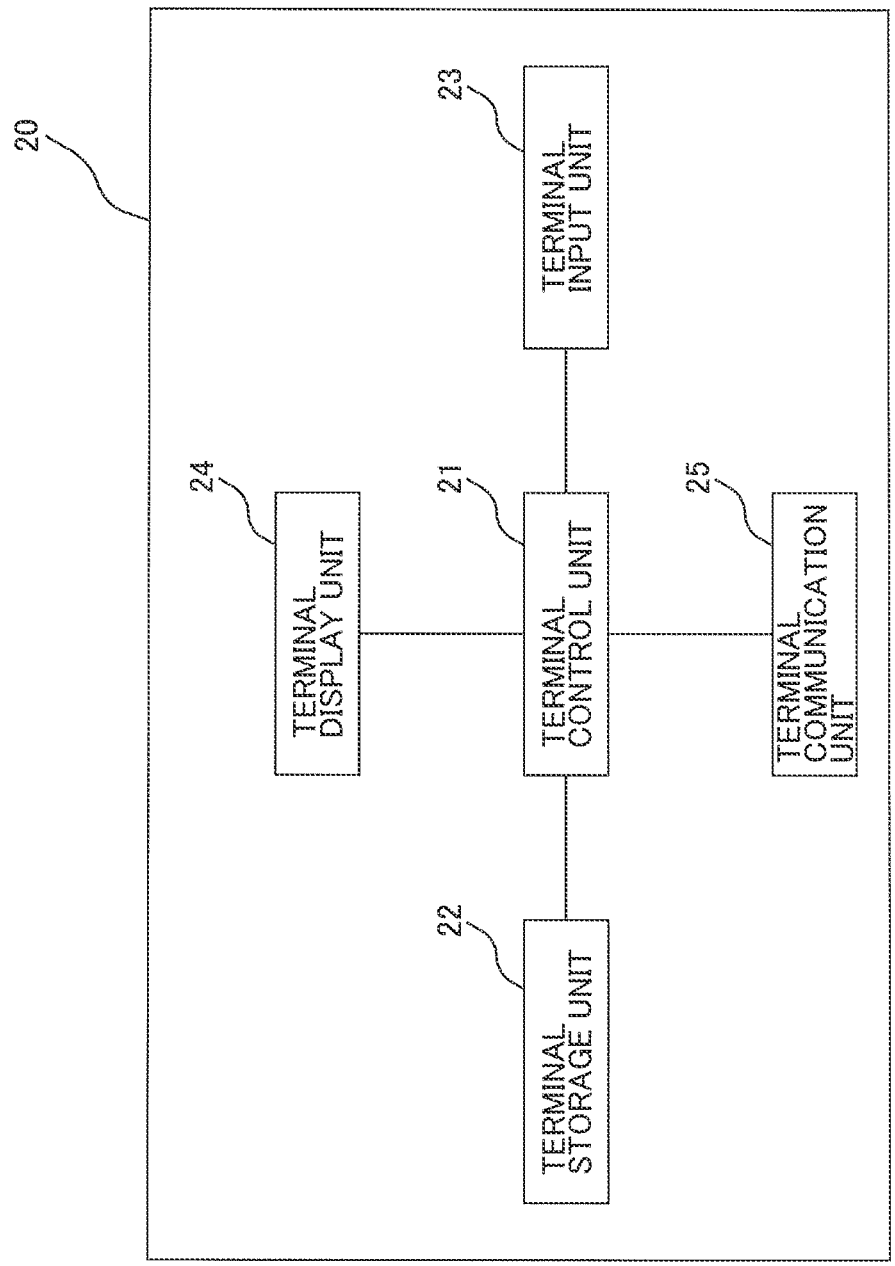
FIG. 3 is a block diagram illustrating a functional configuration of a user terminal 20 according to the present embodiment.

FIG. 3 is a block diagram illustrating a functional configuration of the user terminal 20. The user terminal 20 according to the present embodiment includes a terminal control unit 21, a terminal storage unit 22, a terminal input unit 23, a terminal display unit 24, and a terminal communication unit 25.

The terminal control unit 21 transfers data among the units, and controls the entire user terminal 20.

The terminal storage unit 22 is configured to be connected to the terminal control unit 21 through a bus, and perform processes to refer, read, and rewrite the stored data in response to commands from the terminal control unit 21.

The terminal input unit 23 is a unit with which the player performs various operations (game operations, text input operations, and the like), and is realized, for example, by an operating button, a touch panel or the like. In the present embodiment, the user is instructed to perform input operations using the buttons displayed in unspecific locations, as will be described later, the terminal input unit 23 is realized preferably by a touch panel.

The terminal display unit 24 is a unit for displaying a game screen (mission screen and the like, which will be described later) generated based on game information according to commands from the terminal control unit 21, and is realized, for example, by a liquid crystal display (LCD) and the like.

The terminal communication unit 25 is a unit that performs communication with the server device 10, and has a function as a reception unit for receiving signals and various types of data transmitted from the server device 10, and a function as a transmission unit for transmitting signals and various types of data to the server device 10 in response to commands from the terminal control unit 21. The terminal communication unit 25 is realized, for example, by an NIC (Network Interface Card), and the like.

GAME OPERATION

Game Outline

An outline of the game provided by the game system 1 will be described below.

The game (social game) provided in the present embodiment progresses as a player accomplishes missions.

The "mission" in the present embodiment indicates a duty or a task given to the player in the game, and is referred to differently, such as "quest" and "search", depending on games. The mission is accomplished by executing a plurality of events.

The "event" indicates an event that occurs in the mission in progress and, for example, there are events, such as getting money, items, etc., which are usable in the game; and encountering and battling an enemy. A mission accomplishment rate is increased every time one event is accomplished, and when the accomplishment rate reaches 100%, a new mission can be selected assuming that the mission has been cleared.

The player sequentially accomplishes the missions that are given one after another, thereby being able to cause the game to progress.

Information such as experience point, level, money, attack power, defense power, and energy point is set for each player as parameters, these parameters change with game progress. For example, when the player executes a certain event, experience point and money are increased as a result of the event. When the experience point reaches a value equal to or greater than the predetermined value, the level of the player is raised, attack power, defense power, etc., are increased, thereby facilitating game progress.

When the player executes a certain event in the mission, the predetermined amount of energy points is consumed which is set depending on events. When the energy points of the player fall short of the energy points required for executing the event, the event can not be further executed, thereby being unable to cause the mission to progress. The energy point recovers with time.

Mission Progress

Figure 4:
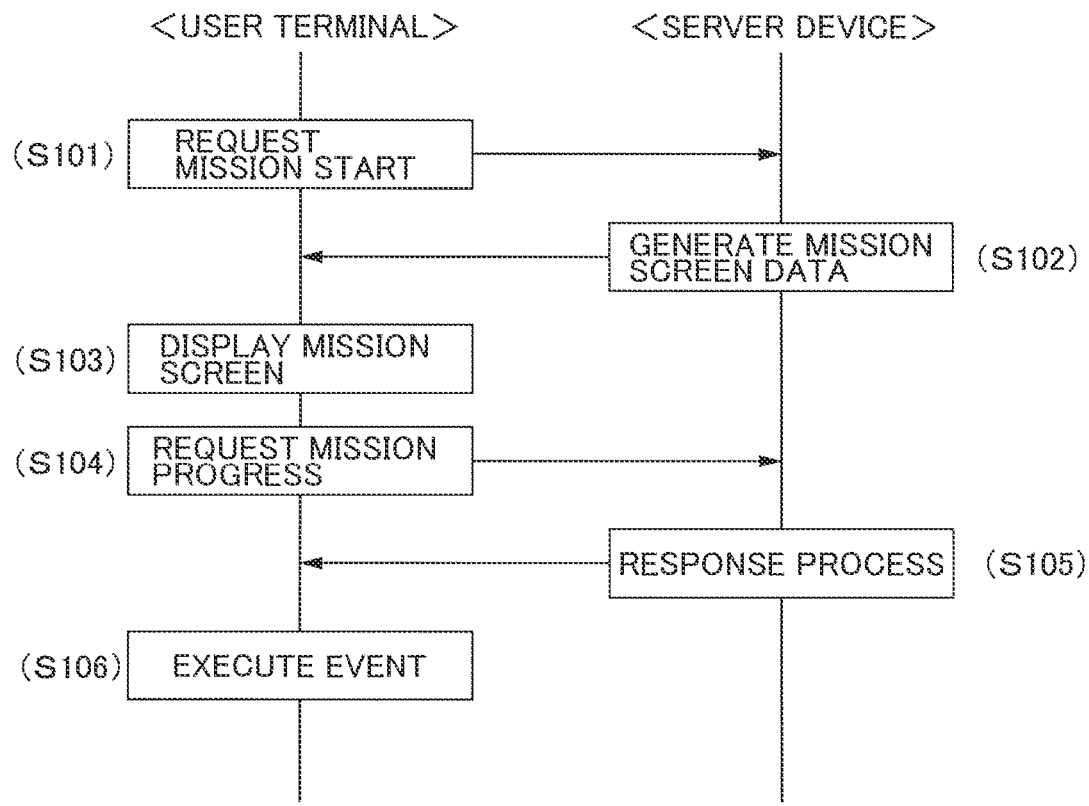
FIG. 4 is a diagram illustrating a flow when causing a mission to progress in the game system 1.

Mission progress in the game system 1 will be described below. FIG. 4 is a diagram illustrating a flow when causing a mission to progress in the game system according to the present embodiment.

First, the player requests start of the mission by operating the user terminal 20 (S101).

The server device 10 receives a request to start the mission from the user terminal 20, the screen data generation unit 111 generates mission screen data for displaying a mission screen on the user terminal 20 (S102). The mission screen includes a mission progress button for executing the event and causing the mission to progress. Further, if the server device 10 receives a request to start the mission from the user terminal 20, the random selection unit 114 performs random selection of an event that will occur in the mission. The details of the specific operations when generating the mission screen data will be described later.

Figure 5:
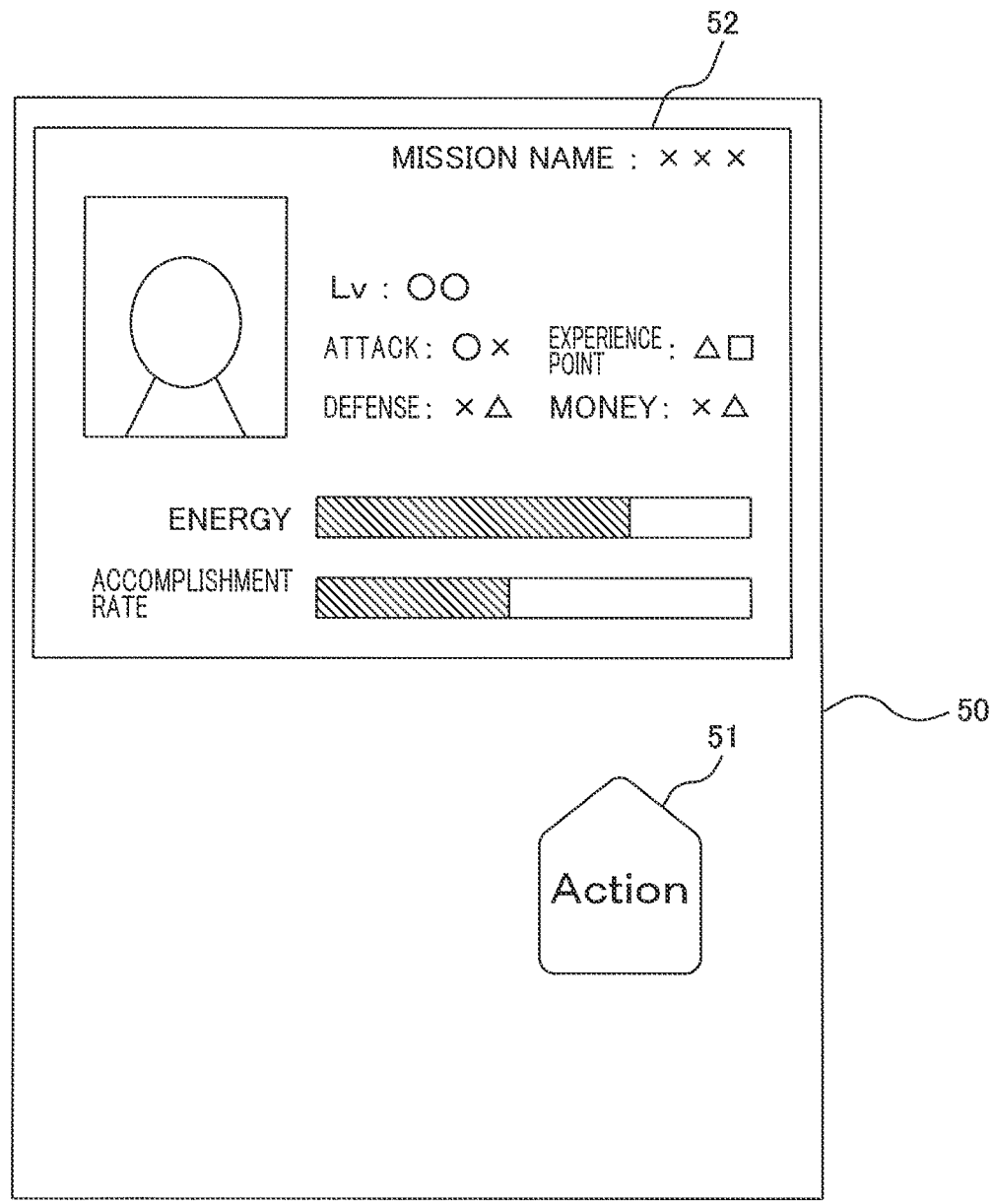
FIG. 5 is a diagram illustrating an example of a mission screen.

The mission screen data generated by the server device 10 is transmitted to the user terminal 20. The user terminal 20 receives the transmitted mission screen data, and displays the mission screen data on the terminal display unit 24 according to the mission screen data (S103). FIG. 5 is a diagram illustrating an example of a mission screen. The user terminal 20 displays a mission screen 50 as illustrated in the figure. The mission screen 50 includes a mission progress button 51 used for causing the mission to progress and a user information display screen 52 that displays the present user parameter information, and the like, as necessary.

The player presses (touches) the mission progress button 51 through the terminal input unit 23 of the user terminal 20, thereby inputting a mission progress request (S104). Although FIG. 5 illustrates an example of a screen displaying only one mission progress button 51 for the purpose of illustration, the mission screen in the present embodiment displays a plurality of mission progress buttons.

The response process unit 113 of the server device 10 performs a response process to cause a predetermined event to occur in response to an input from the mission progress button (S105). The predetermined event indicates an event of getting money or items or battling enemy, as described above, and what types of events will occur is determined based on the result of the random selection performed by the random selection unit 114.

When the event is executed, a process to display an event execution screen or an event clear screen on the user terminal 20, and the like are performed depending on the result (S106).

When the next event is executed, the operations of S101-S106 are repeated again. The mission progresses as such.

Details of Mission Screen Generating Operation

Figure 6:
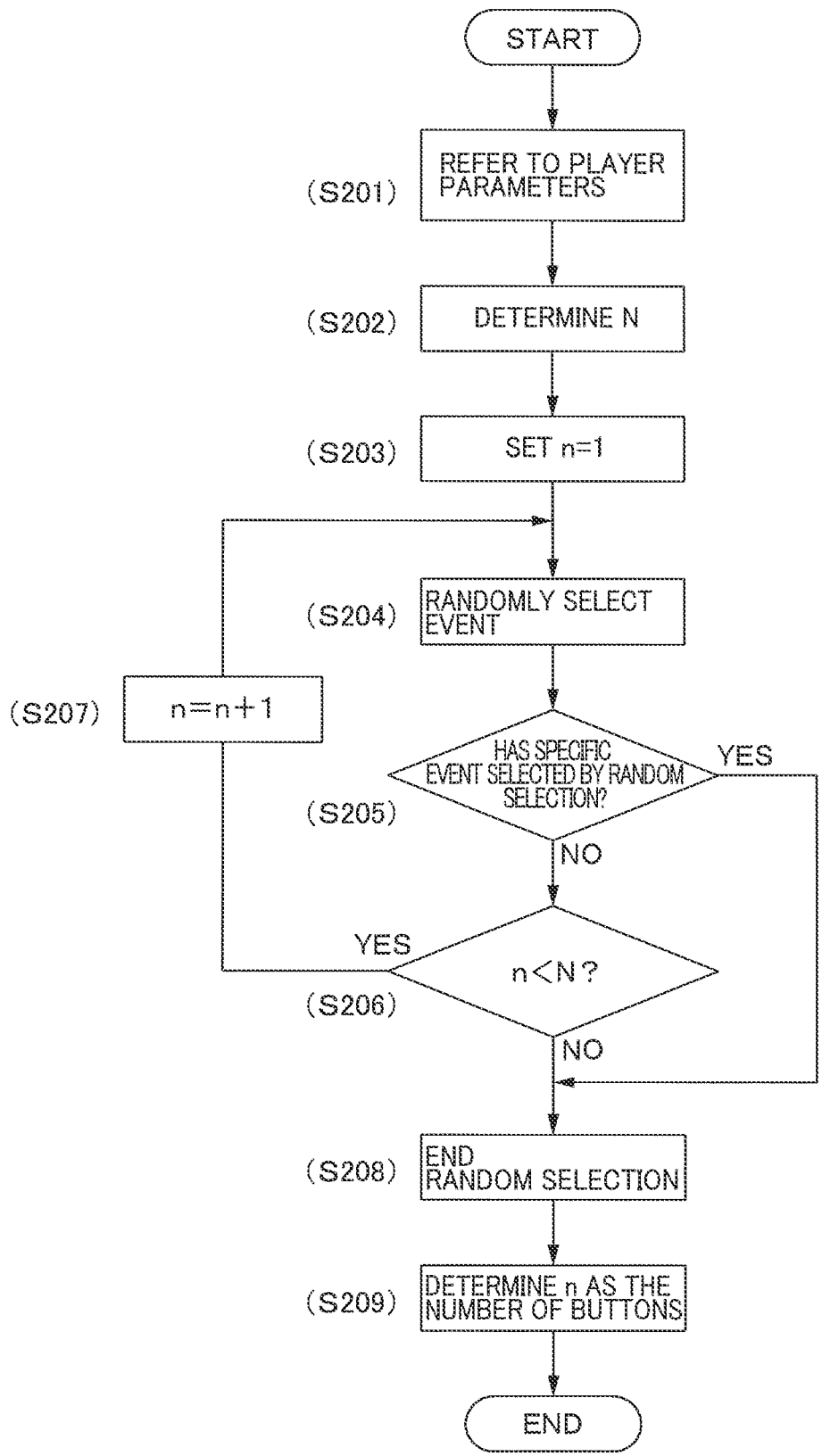
FIG. 6 is a flow chart illustrating an operation when generating a mission screen including a plurality of mission progress buttons.

In the present embodiment, a mission screen displaying a plurality of mission progress buttons is generated (S102 of FIG. 4). FIG. 6 is a diagram illustrating a flow of an operation when generating a mission screen including a plurality of mission progress buttons in the present embodiment.

When mission start is requested from the player, the number determination unit 112 for buttons of the server device 10 refers to the predetermined parameters that are set for the player in each mission (S201). The predetermined parameters indicate, for example, "experience point", "energy point", "mission accomplishment rate", and the like at the time when the player requests mission progress.

Subsequently, the number determination unit 112 for buttons determines the maximum value N of the number of the mission progress buttons to be displayed on the mission screen, based on the parameters that are referred to (S202). The value of N is determined, based on the number of events that can be executed until parameters assigned to the player change and satisfy the predetermined condition. For example, in the case where three types of parameters (experience point, energy point, mission accomplishment rate) are referred to, as described above, the value is determined as follows.

(1) The number of events to be executed is calculated from the experience points required for the player to reach the next level. For example, if the experience points required to reach the next level is 50, and the experience points that can be obtained when one event has been executed is 10, the number of events to be executed is 5. (2) The number of events that can be executed is calculated from the energy points of the player. For example, if the remaining energy points are 30 and the energy points to be consumed for executing one event is 10, the number of events that can be executed is 3. (3) The number of events required for the mission accomplishment rate to reach 100% is calculated. For example, if the mission accomplishment rate at the present time is 40% and the accomplishment rate to be increased when one event has been executed is 10%, the number of events to be executed is 6. (4) The minimum value among the numbers of events calculated based on variations in parameters is determined as the value of N. In the case of the above described (1)-(3), the result is N=3.

Subsequently, the number determination unit 112 for buttons sets n=1 as the number n of the mission progress buttons to be actually displayed on the mission screen (S203).

After n is set, the random selection unit 114 of the server device 10 performs random selection of an event (S204). The types of events vary with games, but a description will be given herein assuming that the random selection is performed among three types of events, which are "getting items", "getting money" and "battle occurrence". Of course, there may be types of events other than those.

The random selection unit 114 judges whether the specific event has been selected as a result of the random selection at S204 (S205), and if the specific event has been selected by random selection (S205: Yes), the random selection is ended (S208). The specific event indicates here a certain type of event that is preset by a system administrator, and indicates, in the present embodiment, an event to end the mission. For example, in the case where "battle occurrence" is the specific event among the above described three types of events, if "battle occurrence" has been selected by random selection, the random selection is ended at that point.

Whereas, if the specific event has not been selected by random selection (S205: No), the random selection unit 114 compares the magnitude between n and N (S206). If n≥N (S206: No), the random selection is ended (S208), and if n<N (S206: Yes), n=n+1 is set (S207) and the random selection is performed again (S204). That is, the random selection unit 114 repeatedly perform random selection while n is being incremented until n≥N is satisfied.

The number determination unit 112 for buttons determines the value of n at the time when the random selection is ended, as the number of mission progress buttons to be actually displayed on the mission screen (S209).

As such, in the present embodiment, the random selection unit 114 repeats random selection of an event, until the parameters assigned to the player change and satisfy the predetermined condition, and determines the number of mission progress buttons to be displayed on the mission screen, according to the number of events randomly selected by the number determination unit 112 for buttons.

Since N=3 in the above described example, if the specific event has not been selected by the random selection (or if the specific event has been selected by the third random selection), random selection is repeated three times, and it is determined that the number of the mission progress buttons is three (n=3). Whereas, the specific event is selected by the random selection in midstream, no more random selection is performed, and it is determined that the number of the mission progress buttons is one or two (n=1, 2).

Figure 7:
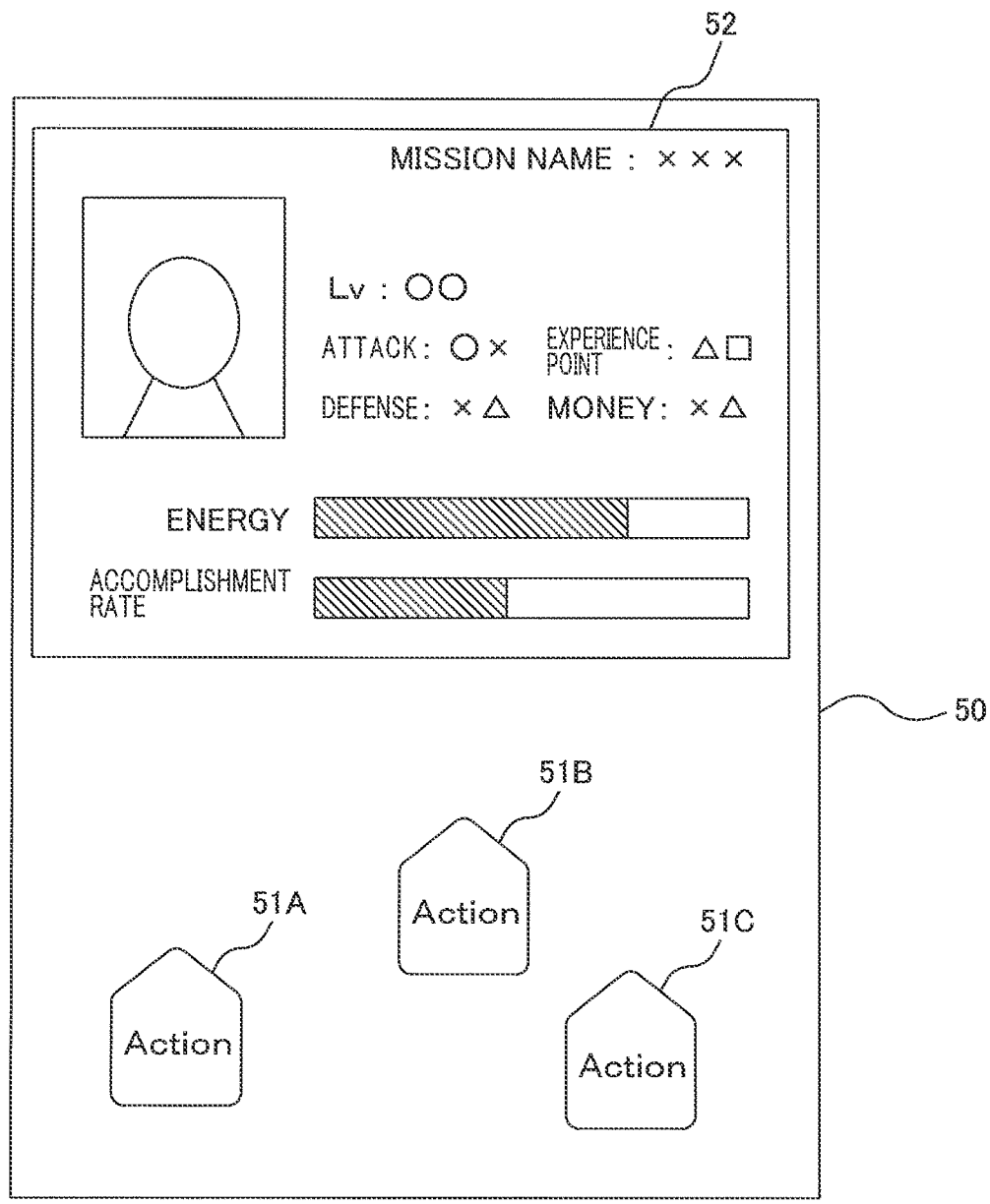
FIG. 7 is a diagram illustrating an example of a mission screen displaying a plurality of mission progress buttons.

The screen data generation unit 111 generates mission screen data based on the determined number of buttons. The generated mission screen data is transmitted from the server device 10 to the user terminal 20, and the user terminal 20 displays the mission screen including a plurality of mission progress buttons on the terminal display unit 24 according to the received mission screen data. FIG. 7 is a diagram illustrating an example of a mission screen displaying a plurality of mission progress buttons. The figure illustrates an example in which three mission progress buttons 51A-51C are displayed. The locations at which the buttons are displayed on the mission screen are arbitrary and determined in a random manner by the screen data generation unit 111.

The functions of three mission progress buttons 51A-51C are the same, and from whichever button among the three buttons the player (user) inputs (pushes whichever button), the order of events to occur is determined in advance by random selection of events by the random selection unit 114. In other words, the event that occurs when the mission progress buttons is pushed on the n-th time is determined based on the n-th random selection result. However, which event will occur at a press of which button is not known from the player's side, and thus it is possible to cause the player to feel like as if an event will occur based on the player's own choice (choice of button to be pressed), thereby being able to raising interest while the mission is in progress.

Further, in causing the mission to progress, it is preferable that the player's pushing the event progress button and an event occurring causes the pushed button to be erased from the mission screen. In this case, the screen data generation unit 111 generates the mission screen with the number of mission progress buttons decreased in response to each input from the player through the mission progress button. Then, the user terminal 20 displays the new mission screen with the number of mission progress buttons decreased. For example, in FIG. 7, if the mission progress button 51A is pressed, the button 51A is erased and the mission screen with two mission progress buttons 51B and 51C is displayed.

Every time the player presses the mission progress button (executes an event), the number of buttons is decreased, and thus it is possible to cause the player himself/herself to expect that a certain event will occur when all the buttons on the mission screen have been pressed. In the above described example, finishing pressing all the buttons will result in occurrence of special events, such as rising in level, mission accomplishment, etc., or occurrence of specific events such as battle occurrence. Depending on "experience point", "energy point", "mission accomplishment rate" and the situation of the random selection of events, at the time when the mission start is requested, two or more of the special events and/or specific events may occur when all the buttons have been pressed.

In the present embodiment, a plurality of mission progress buttons are displayed on the mission screen, thereby being able to raise the interest of the player in the operation of the mission screen. In the conventional game, since only one mission progress button was displayed on the mission screen, the player had no choice of actions, resulting in the monotonous operation. Whereas, in the present embodiment, the player is caused to feel as if the player himself/herself could choose an event that will occur during the mission, thereby being able to raise the interest in the operation of the mission screen. At that time, in the server device, the number of buttons to be displayed on the mission screen is determined, and based on this, the mission screen data is generated, and thus the processing load on the hardware side and the load on network are small, thereby reducing a possibility of occurrence of problems such as inhibiting game progress.

Further, erasing the displayed button in response to each input through the mission progress button, can cause the player to feel like as if a certain event will occur after all the buttons have been pressed, thereby being able to further raise the player's interest.

Modified Example

A description has been given of an example in which a plurality of mission progress buttons are displayed on one mission screen, but a plurality of mission progress buttons may be displayed on two or more mission screens.

Figure 8:
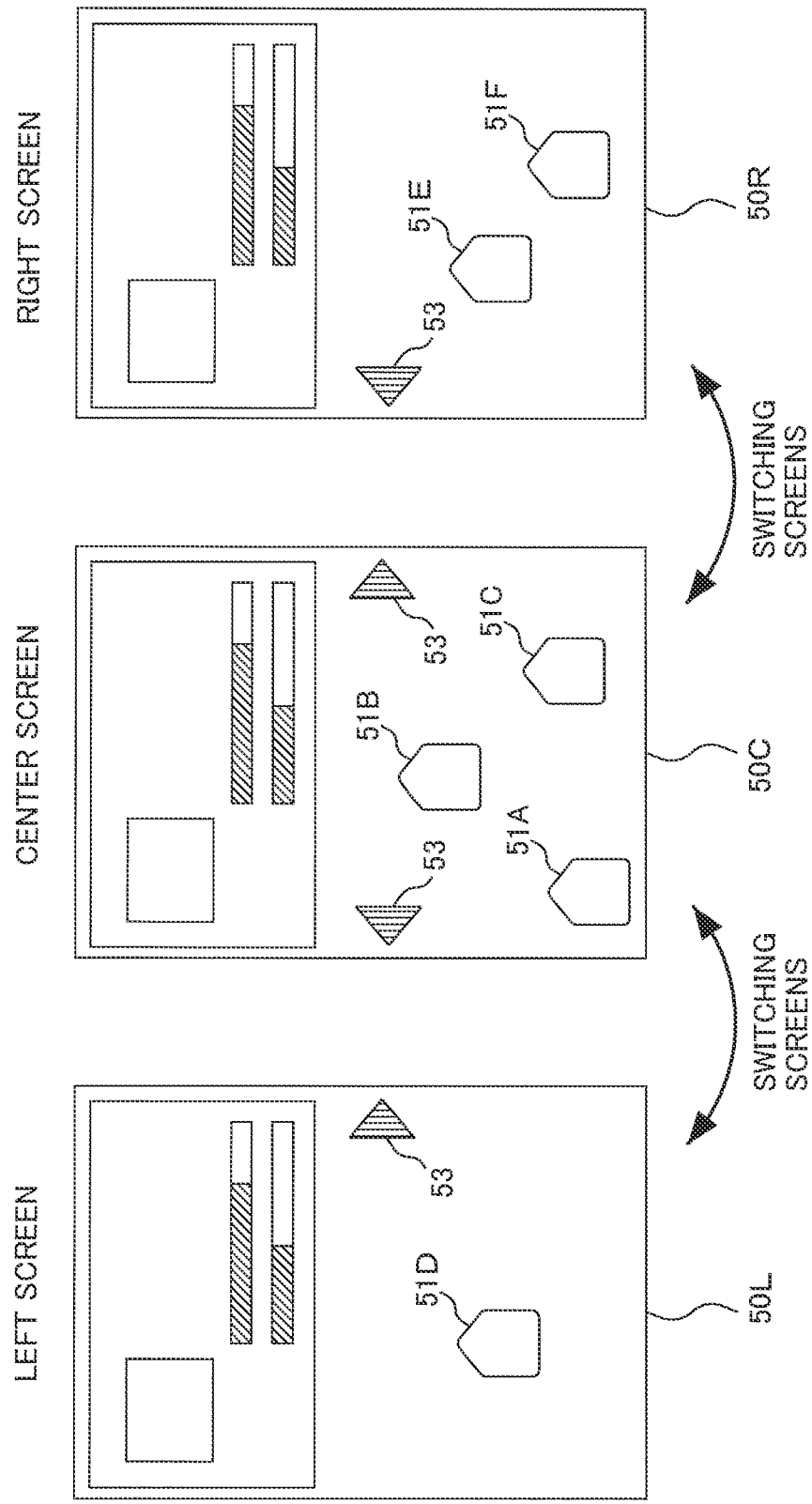
FIG. 8 is a diagram illustrating an example in which a plurality of mission progress buttons are displayed on three mission screens.

FIG. 8 is a diagram illustrating an example in which a plurality of mission progress buttons are displayed on three mission screens. In the figure, three screens, which are a left screen 50L, a center screen 50C, and a right screen 50R, are provided as the mission screens, and the center screen 50C displays three mission progress buttons 51A-51C, the left screen 50L displays one mission progress button 51D, and the right screen 50R displays two mission progress buttons 51E and 51F. Further, each of the screens displays a screen switching button 53.

The number n (6 in FIG. 8) of the whole mission progress buttons is determined by the number determination unit 112 for buttons in accordance with the flow in FIG. 6. The screen data generation unit 111 generates the arbitrary number (3 screens in FIG. 8) of the mission screen data, divides the determined n number of buttons among the screens, and generates a plurality of mission screen data including the screen switching buttons. The number of the mission screens and which button is displayed in which screen may be determined in a random manner, or may be determined in advance by a person such as a system administrator.

The player causes the mission to progress, switching among a plurality of mission screens as well as seeking a mission progress button in a mission screen operation, thereby facilitating feeling a game element, so that the interest can be raised.

Other Embodiment

The above described embodiments of the present invention are simply for facilitating the understanding of the present invention and are not in any way to be construed as limiting the present invention. The present invention may variously be changed or altered without departing from its spirit and encompass equivalents thereof. Further, the following embodiments are also included in the present invention.

Generation of Mission Screen

In the above described embodiment, a description has been given of an example in which the number of mission progress buttons to be displayed on the mission screen is determined according to the number of events randomly selected, but the present invention is not limited thereto. For example, the number of mission progress buttons may be determined in a random manner. In this case, a plurality of mission progress buttons are determined by the number determination unit 112 for buttons irrespective of the number of events randomly selected. The player can cause the predetermined event to occur by pressing any of a plurality of mission progress buttons, and thus the interest can be raised further, as compared with the case of pressing only one button. Further, since the process to determine the number of displays of the mission progress buttons is simple, the processing load on the server device is further reduced.

Relation between Mission Progress Button and Event

In the above describe embodiment, a description has been given of an example in which the order of events to occur is determined in advance even if whichever button among a plurality of mission progress buttons is pressed, but the present invention is not limited thereto. For example, the control unit 11 may associates an event to occur, with each of a plurality of mission progress buttons. In the example of FIG. 8, an event is associated with each of the mission progress buttons 51A-51F, individually. In this case, the events to occur vary with the mission progress buttons chosen by the player. In other words, the order of events is determined by the operation performed by the player. For example, there is a possibility that the specific event such as "battle" may occur all of a sudden when pressing the first mission progress button, thereby being able to causing the player to expect more thrilling progress.

Information Processing Device

In the above described embodiment, a description has been given providing an example of the game system 1 including one server device 10 as an example of an information processing device, but it is not limited thereto, and the game system 1 may be a system including a plurality of server devices 10 as information processing devices. That is, a plurality of server devices 10 are connected over the network 2, and the server devices 10 may perform various processes in a sharing manner.

Further, a configuration may be such that the user terminal 20 serves a part of a function of an information processing device. In this case, the information processing device is configured with the server device 10 and the user terminal 20.

The information processing device is a computer including a processor and a memory.

Game Program

In the game system 1 in the above described embodiment, a description has been given providing an example of the case where the server device 10 and the user terminal 20 are cooperated to generate the mission screen and perform various processes for a mission to progress, but the present invention includes a game program for performing these processes. That is, the server device 10 and the user terminal 20 serving as the information processing device may perform the above described processes based on the game program.

What is claimed is:

1. A server device connected to a user terminal over a network, the server device configured to control a game that progresses as a player accomplishes given missions, the server device comprising:

at least a processor and a memory that implement:

a screen data generation unit configured to generate data of a mission screen in response to a request from the user terminal operated by the player, the mission screen having displayed thereon a plurality of mission progress buttons for causing the missions to progress;

a response process unit configured to perform a process of causing a predetermined event to occur in response to an input from the player through any of the plurality of mission progress buttons;

a number determination process unit that determines a maximum number N of the mission progress buttons to be displayed on the mission screen, wherein the maximum number N is determined based on a number of events that can be executed until parameters assigned to the player change and satisfy a predetermined condition; and a random selection unit configured to randomly select events that will occur during the missions in a repetitive manner, until a number of the events randomly selected by the random selection unit is equal to or greater than the maximum number N of the mission progress buttons to be displayed on the mission screen.

2. The server device according to claim 1, wherein the random selection unit is further configured to end random selection when a specific event has been selected by random selection, the number determination unit for buttons is further configured to determine the number of the mission progress buttons to be displayed on the mission screen, according to the number of the events randomly selected before the specific event has been selected by random selection and before the number of the events randomly selected by the random selection unit is equal to or greater than the maximum number N of the mission progress buttons to be displayed on the mission screen.

3. The server device according to claim 1, wherein the screen data generation unit is further configured to generate data of a mission screen having displayed thereon the mission progress buttons, with the number thereof being decreased in response to each input from the player through the mission progress button.

4. A non-transitory computer-readable record medium storing a game program for causing a computer including a processor and a memory to execute a game that progresses as a player accomplishes given missions, the game program instructing the computer to perform the following processes:

a process to generate data of a mission screen in response to a request from a user terminal operated by the player, the mission screen having displayed thereon a plurality of mission progress buttons for causing the missions to progress;

a process to cause a predetermined event to occur in response to an input from the player through any of the plurality of mission progress buttons;

a process to determine a maximum number N of the mission progress buttons to be displayed on the mission screen, wherein the maximum number N is determined based on a number of events that can be executed until parameters assigned to the player change and satisfy a predetermined condition;

a process to randomly select events that will occur during the missions in a repetitive manner, until a number of the events randomly selected by the random selection unit is equal to or greater than the maximum number N of the mission progress buttons to be displayed on the mission screen; and a process to determine a number of the mission progress buttons to be displayed on the mission screen, according to the number of the events randomly selected.

* * * * *